June 2, 1970 R. H. FOOTE 3,515,804

VIDEO AUTOMATIC GAIN CONTROL SYSTEM FOR MAINTAINING CONSTANT BACKGROUND NOISE LEVEL

Filed May 15, 1967 3 Sheets-Sheet 1

INVENTOR.
R. H. FOOTE
BY Harry A. Herbert Jr
ATTORNEY
Richard J Killoran
AGENT

June 2, 1970 R. H. FOOTE 3,515,804
VIDEO AUTOMATIC GAIN CONTROL SYSTEM FOR MAINTAINING CONSTANT BACKGROUND NOISE LEVEL
Filed May 15, 1967
3 Sheets-Sheet 2
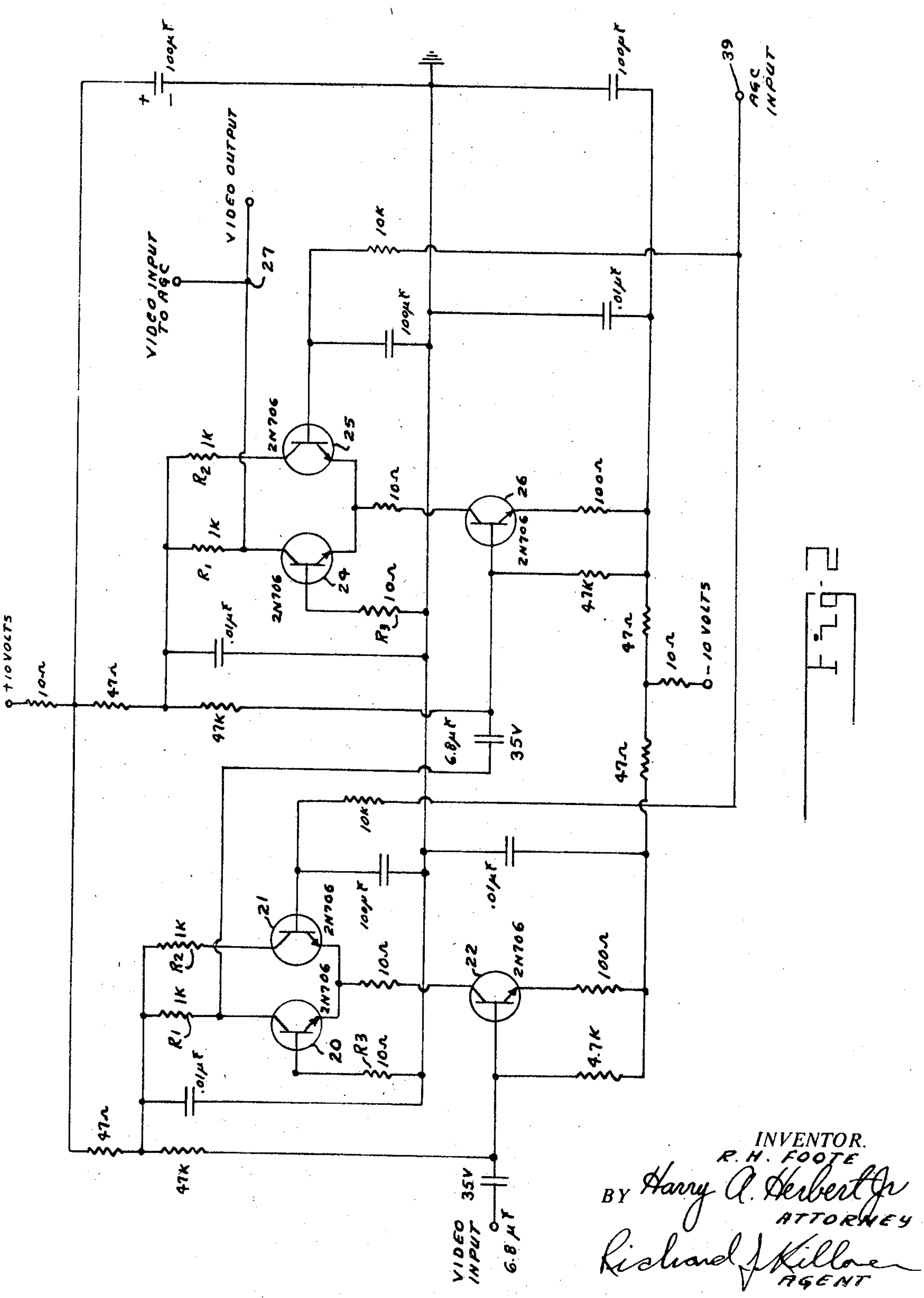
INVENTOR.
R. H. FOOTE
BY Harry A. Herbert Jr
ATTORNEY
Richard J. Killoran
AGENT INVENTOR
R. H. FOOTE
BY Harry A. Herbert Jr
ATTORNEY
Richard J. Kellner
AGENT United States Patent Office 3,515,804

Patented June 2, 1970

3,515,804

VIDEO AUTOMATIC GAIN CONTROL SYSTEM FOR MAINTAINING CONSTANT BACKGROUND NOISE LEVEL

Richard H. Foote, Fort Wayne, Ind., assignor to the United States of America as represented by the Secretary of the Air Force Filed May 15, 1967, Ser. No. 639,931
Int. Cl. H04n 5/52
U.S. Cl. 178—7.3 5 Claims

ABSTRACT OF THE DISCLOSURE

According to this invention, the signal level to be held constant is not the peak black-to-white level, but rather the background noise level. This permits the clipping level to be set so as not to eliminate faint signals which are barely above the noise level. The inverted video signal is applied to an emitter-follower which drives a half-wave detector to provide the gain control voltage. Thus only the noise components of the signal contribute to the automatic gain control voltage. During retrace the input of the amplifiers is clamped to ground.

BACKGROUND OF THE INVENTION

Camera control video circuitry must perform several operations on the video signal before passing it on to the units which follow. One of these operations is the setting of the clipping level and to reject all signals of amplitudes below this level. Since the clipping level must be related to signal amplitude, an automatic gain control must be provided to present a constant signal level to the clipper stage. Conventional automatic gain control systems operate to maintain a constant black-to-white level.

SUMMARY OF THE INVENTION

According to this invention, the signal level to be held constant is not the peak-black-to-white level, but rather the background noise level. This permits the clipping level to be set so as not to eliminate faint signals which are barely above the noise level. The inverted video signal is applied to an emitter-follower which drives a half-wave detector to provide the gain control voltage. Use is made of the shunting effect of a voltage controlled transistor to control the gain of a second transistor. A clamping circuit is added to the gain control circuit to remove retrace transients which might affect the automatic gain control voltage.

One object of the invention is to provide a gain control voltage which permits the signal level to be held constant at the background noise level.

Another object of the invention is to provide a system for removing retrace transients from the video signal applied to the automatic gain control circuit which might affect the automatic gain control voltage.

These and other objects will be more fully understood from the following detailed description taken with the drawing wherein:

DESCRIPTION OF THE DRAWING

FIG. 2 is a circuit schematic of the two-stage video amplifier used in the system of FIG. 1;

DESCRIPTION OF THE PREFERRED EMBODIMENT

Figure 1:
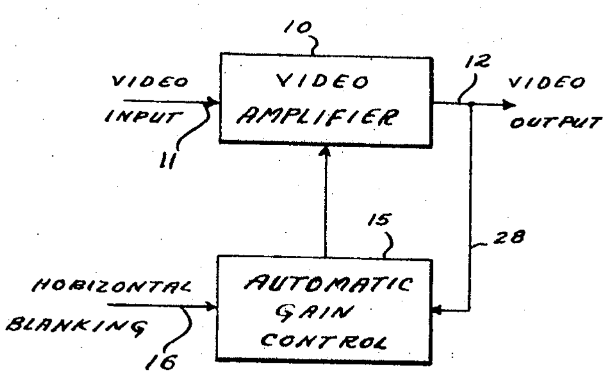
FIG. 1 is a block diagram showing the video automatic gain control system of the invention.

Reference is now made to FIG. 1 of the drawing which shows a video amplifier 10 having an input at 11 and an output at 12. A portion of the output of video amplifier 10 is applied to automatic gain control 15. A horizontal blanking signal is also applied at 16 to the automatic gain control 15 as will be described later. The control voltage from the automatic gain control is applied to the video amplifier as will be described later.

The circuit schematic of FIG. 2 shows two identical voltage controlled gain circuits, one having transistors 20, 21 and 22 and the other having transistors 24, 25 and 26. Since both gain stages are identical, only one will be described. The video input signal is applied to the base of transistor 22 with collector load transistor 20 and resistor $R_1$ in parallel with collector load transistor 21 and resistor $R_2$. The output is taken from the collector of transistor 20 and applied to the input of transistor 26. The base of transistor 20 is connected to ground through $R_3$ and the base of transistor 21 has the control voltage from the gain control circuit applied thereto. As the control voltage is varied, the conductance of transistor 21 is altered. A positive base potential increases the conductance of transistor 21 and a more negative base potential decreases it. Since both D.C. and A.C. will flow in the two parallel circuits through transistors 20 and 21 the conductance of transistor 20 will be changed opposite to that of transistor 21 by the control voltage applied to the base transistor 21. Therefore, by varying the voltage applied to transistor 21, the signal at the output of transistor 20, and therefore the stage gain, can be varied due to the shunting effect of transistor 21 path across the transistor 20 path. Working with this effect is the fact that the gain of transistor 20 itself varies with the current through it so as to increase the effect of the control voltage on the stage gain.

The output of transistor 20 is applied to the input of transistor 26 with an effect as described above controlling the gain of transistor 24.

Figure 4:
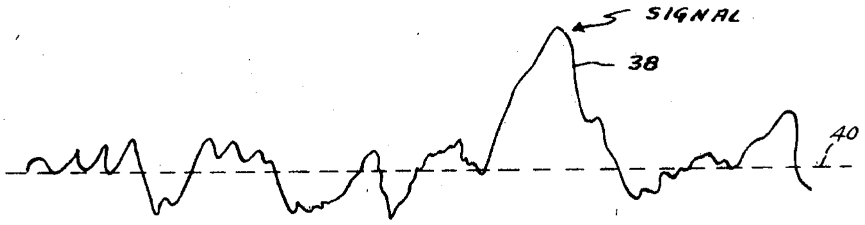
FIG. 4 shows the waveform for one possible video signal-plus-noise that might appear in the output of the device of FIG. 1.
Figure 5:
FIG. 5 shows the waveform of the inverted signal used to develop the gain control voltage in the device of FIG. 3.
Figure 3:
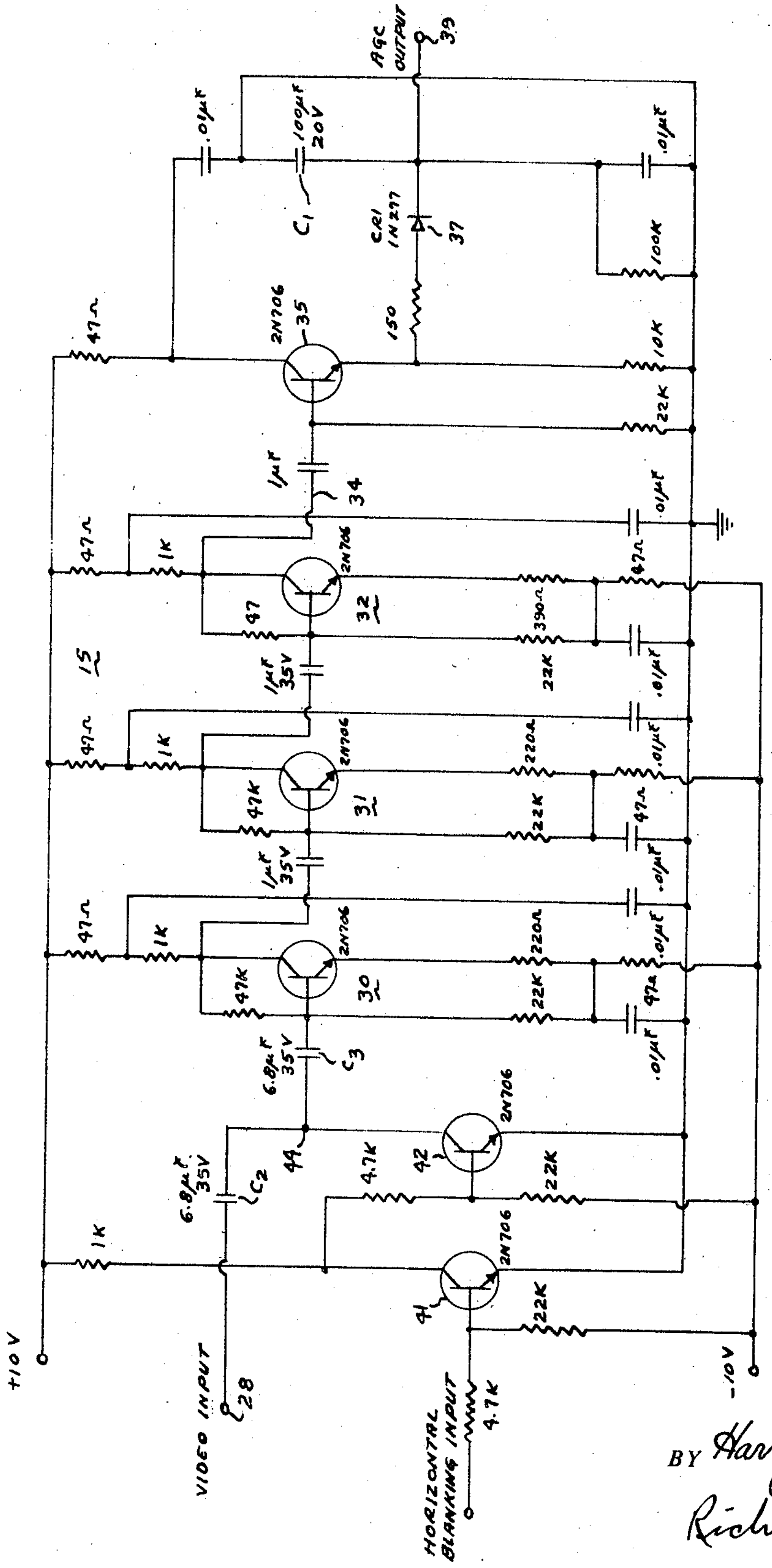
FIG. 3 is a circuit schematic of the automatic gain control circuit used with the system of FIG. 1.

A portion of the output at 27 of transistor 24 is applied to the input 28 of automatic gain control circuit 15. The signal polarity at the input 28 is as shown in FIG. 4. The three transistor amplifiers 30, 31 and 32 of FIG. 3 provide three stages of gain and with three polarity inversions. These transistor amplifiers are substantially identical and employ conventional collector-to-base feedback and emitter degenration to insure stability. The output of transistor 32 at 34 will have the polarity as shown in FIG. 5. This signal is capacitatively coupled transistor 35, an emitter-follower stage, which drives a half-wave detector 37. Though the detector 37 might not be needed since the zero-biased emitter-follower 35 could serve as a detector. Both are used however to allow greater flexibility in design and to remove the possibility of reverse breakdown between the base and emitter of transsistor 35 should the automatic gain control line become excessively positive. Since the signal applied to transistor 35 is an inverted signal, the valid video signal at 38 does not contribute to the automatic gain control voltage developed at output 39. Only the positive noise components which are positive from ground indicated by line 40 in FIG. 5 are passed by the emitter-follower 35 which has its emitter connected to ground through a 10K resistor as shown in FIG. 3. Thus, the output across integrating capacitor $C_1$ at output 39 will be proportional to the noise amplitude since a noise signal is a random signal and the positive inverted noise signal of FIG. 5 will have the same average level as the positive uninverted noise signal of FIG. 4. This voltage is applied to the base of transistors 21 and 25 as shown in FIG. 2.

Transistors 41 and 42 are provided to remove from the video signal any transients which may be present during the sweep retrace interval which might affect the automatic gain control voltage. The horizontal blanking signal which is positive except during retrace is inverted by transistor 41 and applied to transistor 42. Transistor 42 is cut off during scan time and is driven to saturation during the retract interval. The collector of transistor 42 is connected to the junction 44 between condensers $C_2$ and $C_3$. When transistor 42 saturates during retrace, junction 44 is clamped to ground to remove any transients present during this period. During scan time, transistor 42 is cut off and has no effect on the video signal applied to transistor amplifier 30.

There is thus provided a gain control system which permits the signal level to to be held constant at the background noise level.

While a certain spectific embodiment has been described, it is obvious that numerous changes may be made without departing from the general principles and scope of the invention.

I claim:

1. A video automatic gain control system comprising: an emitter-follower semiconductor circuit; an amplifier circuit; means for applying a video signal including noise and valid video signals to said amplifier circuit; said amplifier circuit including means for inverting said video signal; means, connected between said amplifier circuit and said emitter-follower circuit, for applying said inverted video signal to said emitter-follower circuit; means, in the output of said emitter-follower circuit for providing a D.C. gain control voltage in response to said inverted video signal; a video amplifying circuit; said amplifying circuit including a first semiconductive device having an emitter, a collector and base; a second and third semiconductive device, each having an emitter, a collector and a base, connected in parallel in the collector load circuit of said first semiconductive device; a video output circuit connected to said second semiconductive device; and means for connecting said gain control voltage to said third semiconductive device to control the flow of current therethrough, whereby the gain of said second semiconductive device is varied by the shunting effect of said third semiconductive device.

2. The device as recited in claim 1 wherein said means, in the output of the emitter-follower circuit for providing a D.C. gain control voltage, is a half-wave detector and an integrating capacitor.

3. The device as recited in claim 2 including means, connected in the input circuit of said amplifier circuit, for blocking application of said video signal to said amplifier circuit during the retrace time of said video signal.

4. The device as recited in claim 3, wherein means for inverting said video signal is a three stage amplifier circuit.

5. The device as recited in claim 4 wherein said second and third semiconductive devices have their emitters connected to the collector of said first semiconductive device; load resistors connected to the collectors of said second and third semiconductive device; the output of said second semiconductive device being connected between the collector and its load resistor; means for connecting the base of said second transistor to ground potential; said gain control voltage being connected to the base of said third transistor.

References Cited

UNITED STATES PATENTS

| | | | |
|---|---|---|---|
| 2,401,458 | 6/1946 | Buckbee | 178—7.1 |
| 2,506,668 | 5/1950 | Haynes | 178—7.1 |
| 2,995,621 | 8/1961 | Freedman | 178—7.3 |
| 3,206,547 | 9/1965 | Leitich | 178—7.1 |
| 3,210,683 | 10/1965 | Pay | 330—29 X |

ROBERT L. GRIFFIN, Primary Examiner

J. C. MARTIN, Assistant Examiner